(12) United States Patent
Xiang et al.

(10) Patent No.: US 12,182,984 B2
(45) Date of Patent: Dec. 31, 2024

(54) REPAIR METHOD AND REPAIR APPARATUS FOR FLEXIBLE PANEL, DEVICE AND STORAGE MEDIUM

(71) Applicant: BEIJING XIAOMI MOBILE SOFTWARE CO., LTD., Beijing (CN)

(72) Inventors: Xiao Xiang, Beijing (CN); Jian Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 575 days.

(21) Appl. No.: 17/478,711

(22) Filed: Sep. 17, 2021

(65) Prior Publication Data

US 2022/0309642 A1 Sep. 29, 2022

(30) Foreign Application Priority Data

Mar. 29, 2021 (CN) .......................... 202110335713.3

(51) Int. Cl.
*G06T 7/00* (2017.01)
*G06F 18/214* (2023.01)
*G06F 18/2431* (2023.01)
*G06N 20/00* (2019.01)

(52) U.S. Cl.
CPC .......... *G06T 7/0004* (2013.01); *G06F 18/214* (2023.01); *G06F 18/2431* (2023.01); *G06N 20/00* (2019.01); *G06T 2207/20081* (2013.01); *G06T 2207/30108* (2013.01)

(58) Field of Classification Search
CPC .............. G06V 20/188; G01S 13/9004; G01S 13/9027; G01S 19/14; G06F 18/21; G06F 18/24323; G06F 18/256; G06N 5/02; G06N 5/01

USPC .......................... 382/141; 73/849; 356/237.2
See application file for complete search history.

(56) References Cited

U.S. PATENT DOCUMENTS

| | | | |
|---|---|---|---|
| 7,136,097 B1 * | 11/2006 | Toyoda ................. | H04N 25/707 |
| | | | 348/222.1 |
| 9,483,819 B2 * | 11/2016 | Chen ................... | G01N 23/2251 |
| 11,486,697 B1 * | 11/2022 | Tyson, II ............... | G01N 21/33 |
| 2006/0226865 A1 | 10/2006 | Gallarda et al. | |
| 2009/0272198 A1 * | 11/2009 | Wen .......................... | G01N 3/20 |
| | | | 73/849 |

(Continued)

FOREIGN PATENT DOCUMENTS

| | | |
|---|---|---|
| CN | 109118482 A | 1/2019 |
| CN | 112184667 A | 1/2021 |
| WO | WO 2006078916 A2 | 7/2006 |

OTHER PUBLICATIONS

European Patent Application No. 21199364.7 Search and Opinion dated Mar. 14, 2022, 8 pages.

(Continued)

*Primary Examiner* — Kathleen Y Dulaney
(74) *Attorney, Agent, or Firm* — Cozen O'Connor (57) ABSTRACT

A repair method for a flexible panel. The method includes: obtaining first image information of a flexible panel to be repaired; determining a first classification tag of the flexible panel to be repaired based on a deep learning model and the first image information; and determining an operating parameter of a repair device according to the first classification tag, and repairing the flexible panel to be repaired based on the operating parameter.

15 Claims, 3 Drawing Sheets

(56) References Cited

U.S. PATENT DOCUMENTS

| | | | | |
|---|---|---|---|---|
| 2012/0002357 A1* | 1/2012 | Auld | ................ | G09F 11/30 |
| | | | | 361/679.01 |
| 2016/0011545 A1* | 1/2016 | Kakishima | ............ | G03G 15/20 |
| | | | | 399/82 |
| 2017/0030863 A1* | 2/2017 | Holmes | .............. | G01N 29/2468 |
| 2019/0080446 A1* | 3/2019 | Kuzmin | ............... | G06V 30/144 |
| 2019/0206747 A1* | 7/2019 | Yi | ...................... | H01L 27/1222 |
| 2020/0074224 A1* | 3/2020 | Hayashi | .............. | G06V 10/945 |
| 2020/0134574 A1* | 4/2020 | Ghosh | ................... | G06Q 10/20 |
| 2020/0174291 A1* | 6/2020 | Choi | .................... | G06F 1/1652 |
| 2020/0184194 A1* | 6/2020 | Edara | .................... | G06F 16/29 |
| 2020/0311588 A1* | 10/2020 | Watanabe | ........... | G06F 16/9024 |
| 2021/0056871 A1* | 2/2021 | Lu | .......................... | G09F 9/301 |
| 2021/0110157 A1* | 4/2021 | Sinha | ................... | G06F 18/251 |
| 2021/0158499 A1* | 5/2021 | Tay | ........................ | G06T 7/001 |
| 2021/0201083 A1* | 7/2021 | Wang | ................... | G06V 20/56 |
| 2021/0216062 A1* | 7/2021 | Hsiao | ................ | G05B 19/4183 |
| 2021/0235612 A1* | 8/2021 | Tewari | ................. | G06Q 50/02 |
| 2021/0318673 A1* | 10/2021 | Kitchen | .............. | G05B 13/048 |
| 2021/0389258 A1* | 12/2021 | Wang | ................... | G06V 10/764 |
| 2022/0198228 A1* | 6/2022 | Kuo | .................... | G06F 18/2155 |
| 2022/0276182 A1* | 9/2022 | Zhang | ................... | G06F 18/214 |
| 2023/0419466 A1* | 12/2023 | Zhou | .................... | G06T 7/0002 |

OTHER PUBLICATIONS

Chinese Patent Application No. 202110335713.3 Office Action dated May 23, 2024, 4 pages.
Chinese Patent Application No. 202110335713.3 English translation of Office Action dated May 23, 2024, 6 pages.

* cited by examiner

REPAIR METHOD AND REPAIR APPARATUS FOR FLEXIBLE PANEL, DEVICE AND STORAGE MEDIUM

CROSS-REFERENCE TO RELATED APPLICATION

This application claims priority to and benefits of Chinese Patent Application Serial No. 202110335713.3, filed with the State Intellectual Property Office of P. R. China on Mar. 29, 2021, the entire content of which is incorporated herein by reference.

TECHNICAL FIELD

The present disclosure generally relates to a field of panel production, and more particularly, to a repair method and a repair apparatus for a flexible panel, a device and a storage medium.

BACKGROUND

Although flexible panels have been mass-produced at present, a large number of flexible panels, such as panels with Sandy mura, black masses, etc., are difficult to improve in a short time and need to be repaired by high-temperature baking. In the related art, whether or not to use high-temperature baking to repair a flexible panel is still relying on manual experience. In other words, manual testing is required to determine whether to perform repair, the repair effect, and the repair process, etc. Some production lines require 8-hour baking time to repair flexible panels. Thus, both the production yield rate of flexible panels and production efficiency for repairing flexible panels need to be improved.

SUMMARY

According to certain embodiments of the present disclosure, there is provided repair method for a flexible panel, including: obtaining first image information of a flexible panel to be repaired; determining a first classification tag of the flexible panel to be repaired based on a deep learning model and the first image information; and determining an operating parameter of a repair device according to the first classification tag, and repairing the flexible panel to be repaired based on the operating parameter.

According to certain embodiments of the present disclosure, there is provided a computer device, including: a processor; and a memory capable to store computer programs executable by the processor. The processor is configured to implement the method according to any of above embodiments when executing the computer programs.

According to certain embodiments of the present disclosure, there is provided a non-transitory computer-readable storage medium having stored therein instructions that, when executed by a processor, causes the processor to perform the method according to any of above embodiments.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It is understandable that, after flexible panels are manufactured, some of the flexible panels having defects may be repaired. For example, high-temperature baking can repair optical defects in a flexible panel, such as black blobs, Sandy mura caused by light, over-brightness or over-dark brightness caused by static electricity, and uneven color or brightness distribution of the flexible panel. In the related art, the defects of the flexible panels are judged by the human eyes, that is, types and severity degree of the defects are judged by human eyes, and then whether a defect is the above-mentioned repairable defects and operating parameters (such as baking time of a baking furnace) of a repair device required for repairing the defect are determined based on manual experience. Based on this, due to the limited observation ability of the human eyes, it is obvious that the type of defect and the severity degree of the defect are not accurately determined by humans. Repairing the defect based on this inaccurate judgment result is obviously not beneficial to the repair rate of the flexible panel, thus affecting the production yield rate of the entire production process. In addition, if operating parameters that can repair the maximum defect degree are used to repair all the defects, it is obviously not conducive to the repair efficiency, thereby affecting the production efficiency of the entire production process.

Therefore, the present disclosure provides a repair method for a flexible panel, which is applied to a production and manufacturing field of flexible panels, especially to a repair system corresponding to the repair process of flexible panels. For example, the repair method for a flexible panel is applied to a production workstation of the flexible panel. The production workstation includes a computer device integrated with a calculation processing module, which can be used to process image information and output a processing result of the image information, and can intelligently repair the flexible panel according to the processing result of the image information. The repair method for a flexible panel provided by an embodiment of the present disclosure aims to improve the repair rate and repair efficiency of the flexible panel, thereby improving the production yield rate and production efficiency.

Figure 1:
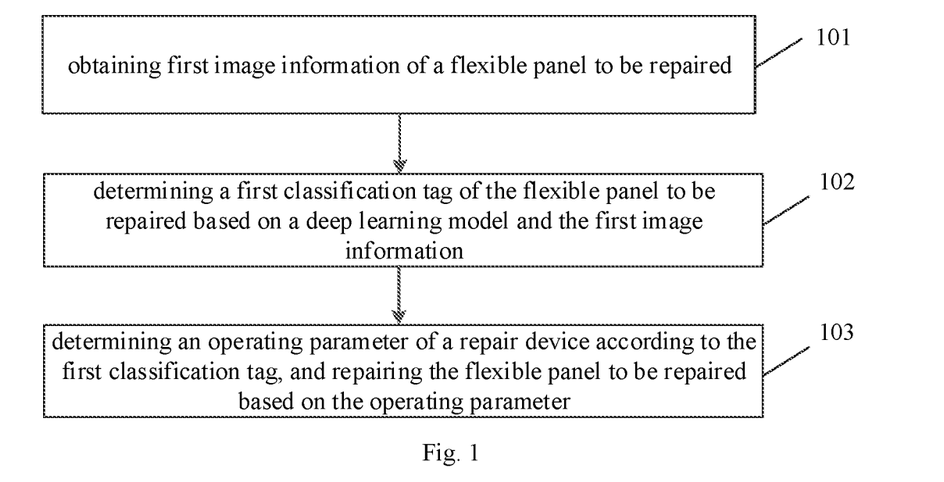
FIG. 1 is a flow chart of a repair method for a flexible panel according to an embodiment of the present disclosure.

FIG. 1 is a flow chart of a repair method for a flexible panel according to an embodiment of the present disclosure. As illustrated in FIG. 1, the method includes the following.

At block 101, first image information of a flexible panel to be repaired is obtained.

It should be noted that, after the flexible panel is produced, optical defects such as Sandy mura and/or black masses may still exist, and these defects may be repaired in a next production process, i.e., a repair process. These defects may be revealed through the surface of the flexible panel. The purpose of obtaining the image information of the flexible panel to be repaired is to determine a defect characteristic of the flexible panel to be repaired according to the image information. The defect characteristic includes at least one of the following: a defect type and defect area. The repair operating parameters of a repair device required for different types of defects are different, and the repair operating parameters of the repair device required for different defect area are also different. The defect type can reflect what type of defect the flexible panel has, and the defect area can reflect the severity degree of the defect of the flexible panel. In this embodiment, the defect characteristics of the flexible panel to be repaired are determined based on the image information of the flexible panel to be repaired, which is more refined and more accurate than determining the defect characteristics of the flexible panel to be repaired though human eyes.

In some embodiments, the first image information of the flexible panel to be repaired may be obtained by following.

The first image information of the flexible panel to be repaired is acquired through an image capturing module installed in the repair device.

It is understandable that, an industrial camera has high image stability, high transmission capacity and high anti-interference ability, etc., and is usually installed on the machine assembly line for usage. In some embodiments, the image capturing module may include an industrial camera. In this way, the collected first image information of the flexible panel may have higher stability, which can meet the requirements of the captured image information in industrial production.

In some other embodiments, the first image information of the flexible panel to be repaired may be obtained by following.

The first image information of the flexible panel to be repaired is acquired from a device other than the repair device.

The first image information of the flexible panel to be repaired may be obtained from a device other than the repair device by following.

Image information of all flexible panels are obtained from a production device corresponding to a previous production process of the repair process is determined as the first image information of the flexible panel to be repaired. In this embodiment, by using the image information of all flexible panels obtained from the production device corresponding to the previous production process of the repair process as the first image information of the flexible panel to be repaired, the omission of defective flexible panels due to manual selection can be reduced. Moreover, in this embodiment, by placing the collection of the first image information in the previous production process of the repair process, the entire production and repair process may be made more intelligent, reducing manual involvement in the processes from production to repair, and reducing labor cost.

It should be noted that, the production device corresponding to the previous production process of the repair process may be an assembly device in an assembly process of the flexible panel.

In some other embodiments, the first image information of the flexible panel to be repaired may be obtained from a device other than the repair device by following. The first image information of the flexible panel to be repaired is obtained from a terminal device networked with the repair device.

The terminal device may include a mobile terminal device or a non-mobile device. The mobile terminal device may include at least one of: a mobile phone, a tablet computer, a notebook computer and a wearable device. The non-mobile device may include at least one of: a desktop computer, a computer-integrated machine, and a server. The server may be an independent server or a server cluster consisting of multiple servers, such as the cloud.

The networking mode between the terminal device and the repaired device may include but is not limited to LAN connection, or base station connection, etc. the LAN connection may include but is not limited to Bluetooth, Wi-Fi, or ZigBee, etc.

In some embodiments, the first image information of the flexible panel to be repaired may be obtained from the terminal device networked with the repair device by the following.

Processed first image information of the flexible panel to be repaired is obtained from the terminal device networked with the repair device. The processed first image information may include information obtained by graying an original image of the flexible panel to be repaired. Thus, the defect characteristic contained in the first image information is more obvious, and some unnecessary image information input into the repair device is avoided, reducing the amount of information processing of the repair device and improving the efficiency of information processing.

In embodiments of the present disclosure, by obtaining the first image information of the flexible panel to be repaired through the terminal device connected to the repair device, there is no need to install an additional image capturing module in the production line, thus saving the conversion cost of the production line and improving the versatility of the production line.

At block 102, a first classification tag of the flexible panel to be repaired is determined based on a deep learning model and the first image information.

The deep learning model refers to learning internal rules and representation levels of sample data, and interpretation of the information obtained in the learning process, such as a text, an image, sound or other data. The deep learning model may identify the defect characteristic of the flexible panel in the image information, and obtain the first classification tag of the flexible panel corresponding to the image information based on the defect characteristic.

The first classification tag may be represented by characters. For example, the first classification tag may be represented by letters or numbers. The first classification tag may also be represented by a combination of letters and numbers. In short, the characteristics of flexible panels corresponding to different first classification tags are different. For example, a flexible panel to be repaired corresponding to a first classification tag p2.0 has a different characteristic from a flexible panel to be repaired represented by a first classification tag p4.0.

The characteristic of the flexible panel to be repaired refers to a defect characteristic of the flexible panel to be repaired. Defect characteristics of flexible panels corresponding to different first classification tags are different. The defect characteristic may include but is not limited to a defect classification and defect area. It is understandable that, for different types of defects, the operating parameters of the repair device for different types of defects are also different. Similarly, when the defect area is different, the severity degrees of the corresponding defects are different, and the operating parameters of the repair device for defects of different severity degrees are also different. Therefore, the operating parameters of the repair device required for the flexible panel to be repaired corresponding to different first classification tags are different. Thus, the first classification tag may be used to indicate the operating parameter set by the repair device for repairing the flexible panel to be repaired, so that the operating parameter of the repair device may be determined according to the first classification tag.

For example, the operating parameter is an operating duration. Flexible panel to be repaired P2.0 may indicate that the repair duration required for this type of flexible panel to be repaired is 2 hours, and flexible panel to be repaired P4.0 may indicate that the repair duration required for this type of flexible panel to be repaired is 4 hours.

For example, the first classification tag of the flexible panel to be repaired may be determined based on a deep learning model and the first image information by following.

The image information is input into the deep learning model to determine the first classification tag of the flexible panel to be repaired.

The deep learning model may identify the input first image information, and determine the first classification tag corresponding to the first image information.

At block 103, an operating parameter of a repair device is determined according to the first classification tag, and the flexible panel to be repaired is repaired based on the operating parameter.

The first classification tag may indicate the operating parameters of the repair device for repairing the flexible panel to be repaired, therefore, the operating parameters of the repair device may be determined according to the first classification tag, and then the flexible panel to be repaired is repaired according to the operating parameters.

The operating parameter may include but is not limited to at least one of an operating duration and an operating temperature.

In embodiments of the present disclosure, the first image information of the flexible panel to be repaired may be input into the deep learning model, the flexible panel to be repaired corresponding to the first image information may be intelligently classified based on the deep learning model, thus there is no need for classifying by manual experience, which can reduce inaccurate classification caused by labor participating, thereby reducing the problem of low repair rate caused by inaccurate manual judgment, and improving the production yield rate of the flexible panels. In addition, manual experience classification is not required, thus the requirement for operator experience can be reduced, and the operability of the repair process in the production process is improved. In addition, the flexible panel to be repaired may be intelligently classified according to the deep learning model, the operating parameters of the repair device are determined based on the first classification tag, and the flexible panel to be repaired is repaired according to the operating parameters, thus it is not necessary to use a unified repair plan to repair all the flexible panels to be repaired, which can reduce situations such as unsuccessful repair or incomplete repair caused by the use of a unified repair plan for repair. This may also increase the repair rate of the flexible panel, thereby increasing the production yield rate of the flexible panel. At the same time, there is no need to manually repair the flexible panel to be repaired through repeated repair tests on the flexible panel to be repaired. In this way, the repair efficiency of the flexible panel is improved, and the production efficiency of the flexible panel is improved.

In the above embodiments, high-temperature baking is an example for repairing the defects. In the related art, when the high-temperature baking is used to repair the flexible panel, whether it can be repaired, the repair effect and the operating parameters of the repair device during the repair may be tested. For example, the repair effect is checked every two hours. If the repair is successful, the flexible panel is taken out from the baking furnace, if not, baking continues. This is obviously not conducive to the repair efficiency of the flexible panel. In the related art, a fixed-time high-temperature baking method is used to repair the flexible panel to be repaired. For example, 8 hours is uniformly used for repair. However, some flexible panels may be repaired in as little as 2 hours. Thus, the baking furnace is still occupied in the remaining 6 hours, which makes the baking furnace unable to be fully utilized, and is also not conducive to the repair efficiency of the flexible panel. In addition, the unified use of 8 hours for repair, some flexible panels may be unsuccessfully repaired or insufficiently repaired in the 8 hours, resulting in a low repair rate, and further resulting in a low production yield rate of the flexible panel.

In this embodiment, the first image information of the flexible panel to be repaired is obtained, the first classification tag of the flexible panel to be repaired is determined according to the deep learning model and the image information, then the operating parameter of the repair device is determined according to the first classification tag, and the flexible panel to be repaired is repaired according to the operating parameter, thus the low repair efficiency caused by manual testing may be avoided. At the same time, the problems of low utilization of repair device resources, low repair efficiency and low repair rate caused by the repair of using uniform operating hours. Therefore, by obtaining the image information of the flexible panel to be repaired, determining the first classification tag of the flexible panel to be repaired according to the deep learning model and the image information; and repairing the flexible panel to be repaired based on the first classification tag, not only the production yield rate of the flexible panel is improved, but also the production efficiency of the flexible panel is improved.

In some exemplary embodiments, the method further includes the following.

The deep learning model is determined based on a preset number of flexible panel samples to be repaired.

The deep learning model is determined based on a preset number of flexible panel samples to be repaired. It is understandable that, for general neural network models, such as Alexnet, Googlenet, ZFNet, or ResNet models, when applied in different scenarios, learning may be performed based on samples provided by a specific scenario to obtain a deep learning model for use in that scenario. In this embodiment, the general neural network model is learned through a predetermined number of samples of the flexible panels to be repaired to obtain a deep learning model capable of predicting a first classification label of the flexible panel to be repaired.

The predetermined number refers to the number of samples required for training the deep learning model. It is understandable that different deep learning models require different number of samples. In some embodiments, the predetermined number may be determined by the general neural network model used.

In some embodiments, the preset number of flexible panel samples to be repaired may include: flexible panels to be repaired with various defect characteristics. In order to make the samples of the flexible panels to be repaired more referential, the preset number of the flexible panel samples to be repaired may further include: an equal number of flexible panels to be repaired with the same defect characteristics.

In embodiments of the present disclosure, the flexible panel to be repaired having various defect characteristics are taken as the flexible panel samples to be repaired, so that the samples are more general and referential.

Figure 2:
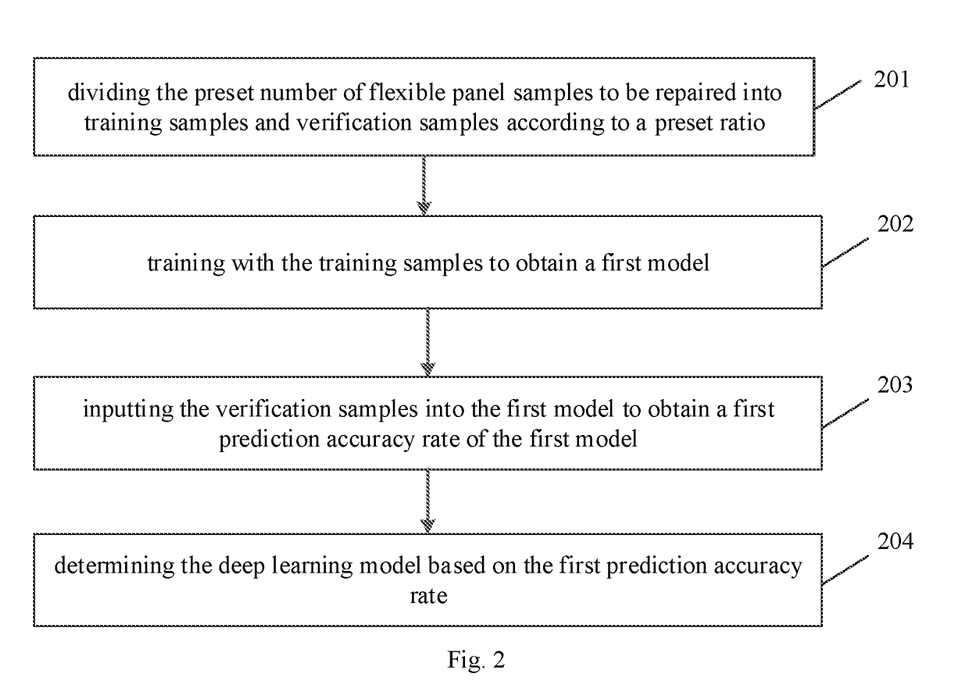
FIG. 2 is a flow chart of a repair method for a flexible panel according to an embodiment of the present disclosure.

In some other embodiments, as illustrated in FIG. 2, FIG. 2 is a flow chart of a repair method for a flexible panel according to another embodiment of the present disclosure. As illustrated in FIG. 2, determining the deep learning model based on the preset number of flexible panel samples to be required may include the following.

At block 201, the preset number of flexible panel samples to be repaired are divided into training samples and verification samples according to a preset ratio.

At block 202, a first model is obtained by training with the training samples.

At block 203, the verification samples are input into the first model to obtain a first prediction accuracy rate of the first model.

At block 204, the deep learning model is determined based on the first prediction accuracy rate.

The preset ratio may be determined according to the requirement of the currently used neural network model for the ratio of training samples to verification samples. Different neural network models have different requirements for the ratio of training samples to verification samples. For example, for a neural network model that requires more learning, the ratio of training samples to validation samples may be higher than that of a neural network model that requires more verification. In some embodiments, the predetermined number of the flexible panel samples to be repaired may be divided into samples to be trained and samples to be verified according to a ratio of 75% to 25%, that is, 75% of the flexible panel samples to be repaired are used as the samples to be trained, 25% of the flexible panel samples to be repaired are used as the samples to be verified.

Training with the samples to be trained to obtain the first model may include training with the samples to be trained by using the neural network model to obtain the first model.

In some embodiments, training with the training samples to obtain the first model may include the following.

Second image information of each flexible panel in the training samples is obtained.

For each flexible panel in the training samples, third image information of a repaired flexible panel is obtained after the flexible panel is repaired based on an n-th operating parameter, wherein n is greater than or equal to 1.

It is determined whether the third image information meets a repair standard for each repaired flexible panel in the training samples.

In response to the third image information of the repaired flexible panel not meeting the repair standard, repairing the flexible panel based on an (n+1)-th operating parameter, until obtained image information of the repaired flexible panel meets the repair standard An operating parameter corresponding to the image information meeting the repair standard is determined as a second classification tag of a corresponding flexible panel in the training samples.

The second image information and a second classification tag of each flexible panel in the training samples are obtained, to form a second image information collection and a second classification tag collection.

The second image information collection and the second classification tag collection are determined as training sample data.

The first model is obtained by training with the training sample data.

It is notable that, during the training, the above operating parameters may be selected from a preset operating parameter set sequentially.

The second classification tag has the same classification rules as the first classification tag. The second classification tag is capable to be used to map the operating parameters corresponding to a flexible panel in the training sample to be repaired.

It may be noted that, the first classification tag is composed of a classification tag in the second classification tag collection.

In this embodiment, each flexible panel in the training samples is repaired by using multiple operating parameters in the current production environment, and then the operating parameters that can accurately meet the repair standard are determined to map the second classification tag of each flexible panel in the training samples. In this way, the accuracy of the classification of the second classification tags in the training samples is high, so that the accuracy of the training samples is high, so that the deep learning model can reduce the learning of invalid data when training based on the training samples, and the learning and training efficiency and accuracy of learning and training are improved, improving the overall performance of the deep learning model.

In another embodiment, training with the training samples to obtain the first model may further include the following.

In response to the third image information of the repaired flexible panel not meeting the repair standard, the flexible panel is repaired based on an (n+1)-th operating parameter, and it is determined whether image information of a flexible panel repaired by using an m-th operating parameter meets the repair standard after the m-th operating parameter is used to repair the flexible panel.

In response to the image information of the flexible panel repaired by using the m-th operating parameter not meeting the repair standard, a preset classification tag is determined as the second classification tag of a corresponding flexible panel in the training samples, where n+1 is smaller than m.

In this embodiment, m may be the number of operating parameters that the repair device can be adjusted or can effectively repaired. For example, for the above baking furnace, the operating parameter is the operating duration, an operating duration of a repair device for effective repair is usually not more than 10 hours. If repair is not completed in more than 10 hours, it indicates that the flexible panel is an irreparable flexible panel. At this time, repairing this type of flexible panel obviously may waste repair device resources, etc., which is not conducive to the improvement of production efficiency. Usually, during repairing, 2 hours may be used as a detection cycle, so 10 hours may use five detection cycles to detect the repair effect. For example, m may be 5. In other words, if the fifth operating parameter, i.e., the operating parameter for the $10^{th}$ hour, still cannot successfully repair the flexible panel, this type of flexible panel can be marked with a preset classification tag.

In some embodiments, by setting a maximum number of detection times, the invalid testing process can be reduced and the extraction efficiency of training samples can be improved.

As another alternative embodiment, different flexible panels in the training samples have different defect characteristics, the defect characteristics includes at least one of: a defect classification and defect area.

In this embodiment, different flexible panels in the training samples having different defect characteristics means that training samples for the same defect characteristic can be represented as one training sample, so that the number of training samples is both small and comprehensive, making the training data used during training the deep learning model based on the training samples small, thus the training speed is high.

For example, the operating parameter is an operating duration. If the flexible panel to be repaired reaches a preset standard after 2 hours repairing, the flexible panel to be repaired is labelled as P2.0. If the flexible panel to be repaired reaches the preset standard after 4 hours repairing, the flexible panel to be repaired is labelled as P4.0. If the flexible panel to be repaired reaches the preset standard after 8 hours repairing, the flexible panel to be repaired is labelled as P8.0. If the flexible panel to be repaired reaches the preset standard after 10 hours repairing, the flexible panel to be repaired is labelled as P8.0. If the flexible panel to be repaired does not reach the preset standard after 10 hours repairing, the flexible panel to be repaired is labelled as NG In some other embodiments, the method further includes: obtaining a preset number of flexible panel samples to be repaired from a server. The server stores samples of the flexible panels to be repaired uploaded by other production lines.

In this embodiment, by obtaining a preset number of flexible panel samples to be repaired from the cloud server, the sample data obtained can be more comprehensive, and the acquisition speed is faster, without self-testing.

The action at block 203 that the verification samples are input into the first model to obtain the first prediction accuracy rate of the first model may include the following.

A third classification tag collection of the verification samples is obtained.

The verification samples are input into the first model to obtain a prediction result collection of the verification samples.

The first prediction accuracy rate of the first model is determined based on the prediction result collection and the third classification tag collection.

The prediction result refers to a prediction result of the third classification tags of the verification samples. For example, a third classification tag of a verification sample is P2.0. If a prediction result of the verification sample is P3.0, it indicates that the prediction result does not match the third classification tag.

Determining the first prediction accuracy rate of the first model based on the prediction result collection and the third classification tag collection may include the following.

A proportion of matching between the predicted results and corresponding third classification tags is determined according to the matching situation of multiple prediction result collections and corresponding third classification tag collections.

The first prediction accuracy rate of the first model is determined based on the proportion.

It is understandable that the higher the proportion of matching between the predicted results and the corresponding third classification tags, the higher the first prediction accuracy of the first model.

In this way, the first prediction accuracy of the first model may be obtained through verifying the verification samples, so as to determine whether to use the first model based on the first prediction accuracy as a deep learning model for intelligent repair of the subsequent flexible panels to be repaired.

In some embodiments, the action at block 204, i.e., determining the deep learning model based on the first prediction accuracy rate may include the following.

If the first prediction accuracy rate is smaller than a preset accuracy rate, a model parameter of the first model is adjusted until the first prediction accuracy rate of the first model is greater than or equal to the preset accuracy rate.

The first model with the adjusted parameter and the first prediction accuracy rate greater than or equal to the preset accuracy rate is determined as the deep learning model.

The preset accuracy may be an accuracy specified in a production standard for flexible panels. Different manufacturers may have different production standards, so the preset accuracy may be different.

In some embodiments of the present disclosure, by adjusting the model parameters of the first model, the first prediction accuracy of the first model is greater than or equal to the preset accuracy, and the first model can be continuously optimized, so that the first model can be used as a deep learning model for determining the first classification tag of the flexible panel to be repaired.

In some embodiments, the action at block 204, i.e., determining the deep learning model based on the first prediction accuracy rate may further include the following.

If the first prediction accuracy rate is smaller than a preset accuracy rate, a second prediction accuracy rate of an alternative second model is determined.

A second model with a second prediction accuracy rate greater than or equal to the preset accuracy rate is determined as the deep learning model.

The first model and the second model belong to different neural network models.

In some embodiments of the present disclosure, by replacing the neural network model, the second model with a prediction accuracy greater than or equal to the preset accuracy is used as the deep learning model, which eliminates the repeated training and verification of the first model, thus improving the acquisition efficiency of the deep learning model. At the same time, it can also reduce the adjustment of model parameters of the first model, reduce the callback steps of model parameters when the deep learning model is used in other scenarios, and improve the universality of the deep learning model.

In some embodiments, repairing the flexible panel to be repaired based on the operating parameter may include the following.

If there are multiple repair devices, the flexible panel to be repaired is delivered to a repair device having a first target operating parameter corresponding to the first classification tag for repair.

Alternatively, if there is one repair device, the operating parameter of the repair device is adjusted to a second target operating parameter corresponding to the first classification tag, and the flexible panel to be repaired is repaired based on the second target operating parameter.

The operating parameters of the first target operating parameter and the second target operating parameter are the operating parameters for repairing the flexible panel to be repaired of the repair device.

For a production environment where there are multiple repair devices, the repair devices preconfigure operating parameters. In embodiments of the present disclosure, according to the first classification tag of the flexible panel to be repaired, the flexible panel to be repaired may be directly put into a repair device having a first target operating parameter corresponding to the first classification tag of the flexible panel to be repaired. For example, the operating parameter also includes the operating duration. An operating duration set for a repair device A is 2 hours. An operating duration set for a repair device B is 4 hours. An operating duration set for a repair device C set is 8 hours. A first classification tag of the flexible panel currently to be repaired is P2.0, then the flexible panel currently to be repaired may be directly delivered to the repair device A according to the first classification tag.

In some embodiments, in order to make the repair system more intelligent, putting the flexible panel to be repaired into the repair device having the first target operating parameter corresponding to the first classification tag of the flexible panel to be repaired may include the following.

The flexible panel to be repaired is directly put into the repair device corresponding to the first target operating parameter of the first classification tag through a conveyor belt. In this way, the production process can be fully automated.

For a production environment where there is one repair device, the operating parameter of the repair device is adjustable. In embodiments of the present disclosure, according to the first classification tag of the flexible panel to be repaired, the operating parameter of the repair device may be adjusted to a second target operating parameter corresponding to the first classification tag. For example, the operating parameter also includes the operating duration. A first classification tag of the flexible panel currently to be repaired is P2.0, then operating parameter of the repair device may be adjusted to 2 hours. In this way, the operating parameter of the repair device may be set more accurately, so as to reduce the waste of resources of the repair device, improving the repair efficiency of the repair device, and improving the production efficiency.

In some other embodiments, repairing the flexible panel to be repaired based on the first classification tag may include the following.

If the first classification tag indicates that the flexible panel to be repaired is a scrapped panel, the flexible panel to be repaired may be removed from the repair device, or the flexible panel to be repaired may be put into a scrap pool.

In this way, by intelligently determining the first classification tag of the flexible panel to be repaired, when the first classification tag indicates that the flexible panel to be repaired is scrapped, the scrapped panel can be removed in time, so as to free up the repair device resources, so as to improve the repair efficiency of the repair device and improve the production efficiency.

Further, a concrete embodiment is provided to further understand the repair method of the flexible panel provided in this embodiment.

In this embodiment, for the way of high-temperature baking, optical defects such as the black blobs and Sandy mura caused by light, Sandy Mura, over-brightness or over-dark brightness caused by static electricity, and the uneven distribution of color or brightness in the flexible panel can be repaired. The repair device here takes the high-temperature baking furnace as an example.

Figure 3:
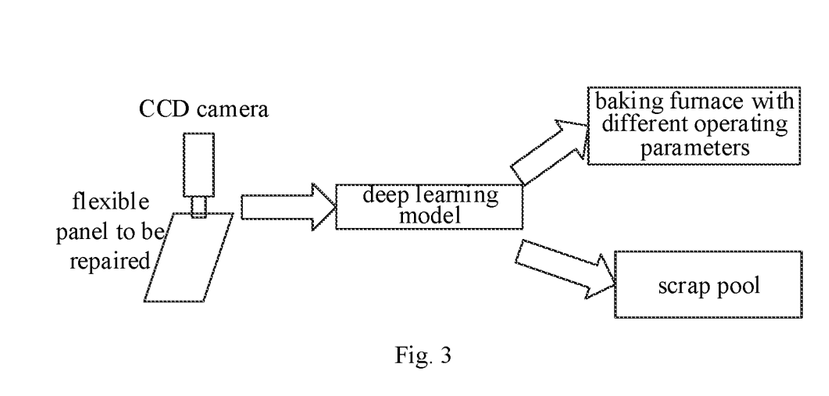
FIG. 3 is a schematic diagram illustrating a scene of a repair method for a flexible panel according to an embodiment of the present disclosure.

FIG. 3 is a schematic diagram illustrating a scene of a repair method for a flexible panel according to an embodiment of the present disclosure. As illustrated in FIG. 3, the image information of the flexible panel to be repaired is collected by a CCD camera, and the first classification tag corresponding to the image information of the flexible panel to be repaired is determined according to a deep learning model. The flexible panel to be repaired is put into a baking furnace with corresponding operating parameters, or put into a scrap pool according to the first classification tag.

Firstly, the CCD camera is used to collect images of the flexible panel samples with poor optics in the mass production, and one image is collected for each flexible panel sample to be repaired. The flexible panel samples to be repaired are put into the baking furnace for baking, and then the flexible panel samples are labelled according to the repair results. Considering the production efficiency, repair yield rate and influence to the characteristics of the flexible panel sample to be repaired, the longest operating duration set in the detection process is 10 hours. The flexible panel sample to be repaired that can be repaired to a standard specification within 2 hours is labelled as P2.0, similarly, 4 hours corresponds to P4.0, 6 hours corresponds to P6.0, 8 hours corresponds to P8.0, 10 hours corresponds to P10.0, and a flexible panel sample to be repaired that fails to be repaired to the standard specification is labelled as NG 75% of the above flexible panel samples to be repaired are taken as samples to be trained and 25% as the samples to be verified. The first model is obtained by training using the samples to be trained. The samples to be verified are input into the first model to obtain the first prediction accuracy of the first model. If the first prediction accuracy does not reach the preset accuracy, the first model is optimized. Optimizing the first model can include: adjusting the model parameters of the first model to make the first prediction accuracy of the first model reach the preset accuracy. In other embodiments, if the first prediction accuracy does not reach the preset accuracy, the first model may be replaced with the second model having a prediction accuracy reaches the preset accuracy.

Finally, a model with a prediction accuracy reaches the preset accuracy is taken as the deep learning model, and the model is input to the production of workstations. The image of each piece of flexible panel is directly input into the deep learning model for automatic determination. If the flexible panel is a scrapped panel, the flexible panel may be directly scrapped. If the flexible panel is not a scrapped panel, the flexible panel to be repaired is put into a repair device having an operating parameter corresponding to a first classification tag of the flexible panel to be repaired for repair, based on the correspondence between operating parameters and first classification tags With the embodiments of the present disclosure, the flexible panels to be repaired are intelligently classified through the deep learning model, and the flexible panels to be repaired are repaired according to the result of classification, which can improve the repair efficiency and repair rate of the flexible panel to be repaired. At the same time, the production yield rate is improved, the capacity of mass production is increased, and utilization of devices and resources is maximized, reducing the cost.

With the embodiments of the present disclosure, the first image information of the flexible panel to be repaired is obtained, the first classification tag of the flexible panel to be repaired is determined based on the deep learning model and the first image information, and the operating parameter of a repair device is determined according to the first classification tag, and the flexible panel to be repaired is repaired based on the operating parameter. That is, in this embodiment, the intelligent classification of the flexible panel to be repaired is carried out through the deep learning model, which improves the intelligence of the repair process. In this way, as the flexible panel to be repaired can be intelligently classified, it does not need to be classified by manual experience, which can reduce the classification errors caused by manual participation, and can also reduce the requirements for the operator's experience, and improve the operability of repair in the production process. In addition, as the flexible panel to be repaired is intelligently classified according to the deep learning model, and the operating parameters of the repair device are determined based on the classification tag, and the flexible panel to be repaired is repaired based on the operating parameters, there is no need to use a unified repair plan to repair all the flexible panels to be repaired, which can reduce situations such as unsuccessful repair or incomplete repair caused by the use of a unified repair plan for repair. In this way, the repair rate of the flexible panel is improved, and the production yield rate of the flexible panel is improved. At the same time, there is no need to manually repair the flexible panel to be repaired through repeated repair tests on the flexible panel to be repaired. In this way, the repair efficiency of the flexible panel is improved, and the production efficiency of the flexible panel is improved.

Figure 4:
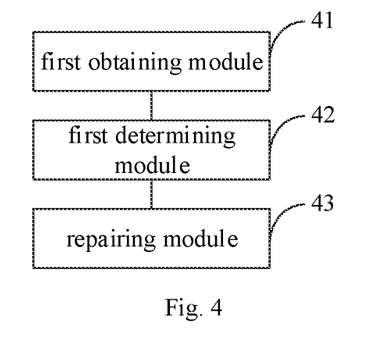
FIG. 4 is a block diagram illustrating a repair apparatus for a flexible panel according to an embodiment of the present disclosure.

FIG. 4 is a block diagram illustrating a repair apparatus for a flexible panel according to an embodiment of the present disclosure. As illustrated in FIG. 4, the apparatus includes a first obtaining module 41, a first determining module 42, and a repairing module 43.

The first obtaining module 41 is configured to obtain first image information of a flexible panel to be repaired.

The first determining module 42 is configured to determine a first classification tag of the flexible panel to be repaired based on a deep learning model and the first image information. The repairing module 43 is configured to determine an operating parameter of a repair device according to the first classification tag, and repair the flexible panel to be repaired based on the operating parameter.

As an alternative embodiment, the apparatus further includes a second determining module, configured to determine the deep learning model based on a preset number of flexible panel samples to be repaired.

The second determining module includes a dividing sub module, a first processing sub module, a second processing sub module, and a third processing sub module.

The dividing sub module is configured to divide the preset number of flexible panel samples to be repaired into training samples and verification samples according to a preset ratio.

The first processing sub module is configured to train with the training samples to obtain a first model.

The second processing sub module is configured to input the verification samples into the first model to obtain a first prediction accuracy rate of the first model.

The third processing sub module is configured to determine the deep learning model based on the first prediction accuracy rate.

As an alternative embodiment, the first processing sub module is configured to: obtain second image information of each flexible panel in the training samples; for each flexible panel in the training samples, obtain third image information of a repaired flexible panel after the flexible panel is repaired based on an operating parameter; determine whether the third image information meets a repair standard for each repaired flexible panel; in response to the third image information of the repaired flexible panel not meeting the repair standard, adjust the operating parameter and repairing the flexible panel based on the adjusted operating parameter, until obtained image information of the repaired flexible panel meets the repair standard; determine an operating parameter corresponding to the image information meeting the repair standard as a second classification tag of the corresponding flexible panel; obtain second image information and a second classification tag of each flexible panel in the training samples, to form a second image information collection and a second classification tag collection; determine the second image information collection and the second classification tag collection as training sample data; and obtain the first model by training with the training sample data.

As an alternative embodiment, the first processing sub module is configured to: in response to the third image information of the repaired flexible panel not meeting the repair standard, adjust the operating parameter, repair the flexible panel based on the adjusted operating parameter, and determine whether image information of a repaired flexible panel meets the repair standard after the operating parameter is adjusted for m times; in response to the image information of the repaired flexible panel not meeting the repair standard after the operating parameter is adjusted for m times, determine a preset classification tag as the second classification tag of a corresponding flexible panel in the training samples, where m is a preset number.

Different flexible panels in the training samples have different defect characteristics, wherein the defect characteristics comprise at least one of a defect classification and defect area.

As an alternative embodiment, the third processing sub module is configured to: in response to the first prediction accuracy rate being smaller than a preset accuracy rate, adjust a model parameter of the first model until the first prediction accuracy rate of the first model is greater than or equal to the preset accuracy rate; and determine the first model with the first prediction accuracy rate greater than or equal to the preset accuracy rate as the deep learning model.

As an alternative embodiment, the third processing sub module is configured to: in response to the first prediction accuracy rate being smaller than a preset accuracy rate, determine a second prediction accuracy rate of an alternative second model; and determine a second model with a second prediction accuracy rate greater than or equal to the preset accuracy rate as the deep learning model.

As an alternative embodiment, the second processing sub module is configured to: obtain a third classification tag collection of the verification samples; input the verification samples into the first model to obtain a prediction result collection of the verification samples; and determine the first prediction accuracy rate of the first model based on the prediction result collection and the third classification tag collection.

As an alternative embodiment, the repairing module 43 is configured to: in response to the repair device being multiple, repair the flexible panel to be repaired by delivering the flexible panel to be repaired to a repair device having a first target operating parameter corresponding to the first classification tag; or in response to the repair device being one, adjust the operating parameter of the repair device to a second target operating parameter corresponding to the first classification tag, and repair the flexible panel to be repaired based on the second target operating parameter.

With respect to the devices in the above embodiments, the specific manners for performing operations for individual modules therein have been described in detail in the embodiments regarding the methods, which will not be elaborated herein.

Figure 5:
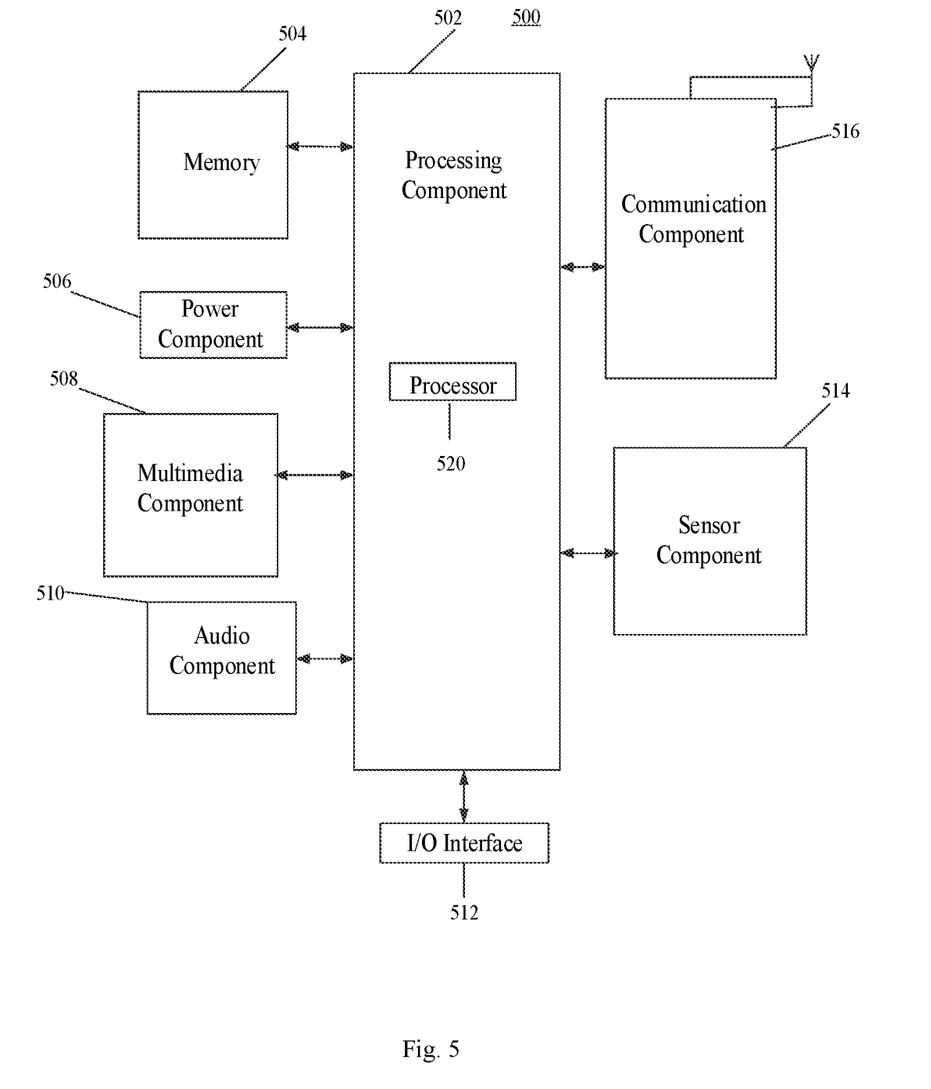
FIG. 5 is a schematic diagram of a repair device for a flexible panel according to an embodiment of the present disclosure.

FIG. 5 is a schematic diagram of a repair device 500 according to an embodiment of the present disclosure. For example, the device 800 may be a mobile phone, a computer, a digital broadcast terminal, a messaging device, a gaming console, a tablet, a medical device, exercise equipment, a personal digital assistant, and the like.

Referring to FIG. 5, the repair device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the repair device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the repair device 500. Examples of such data include instructions for any applications or methods operated on the repair device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the repair device 500. The power component 506 may include a power management system, one or more power sources, and any other components associated with the generation, management, and distribution of power in the repair device 500.

The multimedia component 508 includes a screen providing an output interface between the repair device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the repair device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the repair device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the repair device 500. For instance, the sensor component 514 may detect an open/closed status of the repair device 500, relative positioning of components, e.g., the display and the keypad, of the repair device 500, a change in position of the repair device 500 or a component of the repair device 500, a presence or absence of user contact with the repair device 500, an orientation or an acceleration/deceleration of the repair device 500, and a change in temperature of the repair device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the repair device 500 and other devices. The repair device 500 can access a wireless network based on a communication standard, such as WiFi, 2Q or 3Q or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the repair device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the repair device 500, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having instructions stored thereon that, when executed by a processor of a terminal, cause the terminal to perform the repair method for a flexible panel described in the above embodiments.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for repairing a flexible panel, comprising:
    obtaining first image information of a flexible panel to be repaired;
    determining a first classification tag of the flexible panel to be repaired based on a deep learning model and the first image information; and
    determining an operating parameter of a repair device according to the first classification tag, and repairing the flexible panel to be repaired based on the operating parameter;
    wherein the method further comprises:
    determining the deep learning model based on a preset number of flexible panel samples to be repaired,
    wherein determining the deep learning model based on a preset number of flexible panel samples to be repaired comprises:
    dividing the preset number of flexible panel samples to be repaired into training flexible panel samples and verification flexible panel samples according to a preset ratio;
    training with the training flexible panel samples to obtain a first model;
    inputting the verification flexible panel samples into the first model to obtain a first prediction accuracy rate of the first model; and
    determining the deep learning model based on the first prediction accuracy rate;
    wherein training with the training flexible panel samples to obtain the first model comprises:
    obtaining second image information of each training flexible panel sample;
    for each training flexible panel sample, obtaining third image information of a repaired flexible panel sample after the training flexible panel sample is repaired based on the adjusted candidate operating parameter;
    determining whether the third image information meets a repair standard for each repaired flexible panel sample;
    in response to the third image information of the repaired flexible panel sample not meeting the repair standard, adjusting the candidate operating parameter and repairing the training flexible panel sample based on the adjusted candidate operating parameter, until obtained image information of the repaired flexible panel sample meets the repair standard;
    determining a candidate operating parameter corresponding to the obtained image information meeting the repair standard as a second classification tag of the training flexible panel sample;
    obtaining the second image information and a second classification tag of each training flexible panel sample, to form a second image information collection and a second classification tag collection;
    determining the second image information collection and the second classification tag collection as training sample data; and
    obtaining the first model by training with the training sample data.

2. The method of claim 1, wherein training with the training flexible panel samples to obtain the first model comprises:
    in response to the third image information of the repaired flexible panel sample not meeting the repair standard, adjusting the candidate operating parameter, repairing the training flexible panel sample based on the adjusted candidate operating parameter, and determining whether the obtained image information of the repaired flexible panel sample meets the repair standard after the candidate operating parameter is adjusted for m times;
    in response to the image information of the repaired flexible panel sample not meeting the repair standard after the candidate operating parameter is adjusted for m times, determining a preset classification tag as the second classification tag of the training flexible panel sample, where m is a preset number.

3. The method of claim 1, wherein different training flexible panels samples have different defect characteristics, the defect characteristics comprise at least one of: a defect classification and defect area.

4. The method of claim 1, wherein determining the deep learning model based on the first prediction accuracy rate comprises:
    in response to the first prediction accuracy rate being smaller than a preset accuracy rate, adjusting a model parameter of the first model until the first prediction accuracy rate of the first model is greater than or equal to the preset accuracy rate; and
    determining the first model with the first prediction accuracy rate greater than or equal to the preset accuracy rate as the deep learning model.

5. The method of claim 1, wherein determining the deep learning model based on the first prediction accuracy rate comprises:
    in response to the first prediction accuracy rate being smaller than a preset accuracy rate, determining a second prediction accuracy rate of an alternative second model; and
    determining a second model with a second prediction accuracy rate greater than or equal to the preset accuracy rate as the deep learning model.

6. The method of claim 1, wherein inputting the verification flexible panel samples into the first model to obtain the first prediction accuracy rate of the first model comprises:
    obtaining a third classification tag collection of the verification flexible panel samples;
    inputting the verification flexible panel samples into the first model to obtain a prediction result collection of the verification flexible panel samples; and
    determining the first prediction accuracy rate of the first model based on the prediction result collection and the third classification tag collection.

7. The method of claim 1, wherein repairing the flexible panel to be repaired based on the operating parameter comprises:

in response to the repair device being multiple, repairing the flexible panel to be repaired by delivering the flexible panel to be repaired to a repair device having a first target operating parameter corresponding to the first classification tag; or in response to the repair device being one, adjusting the operating parameter of the repair device to a second target operating parameter corresponding to the first classification tag, and repairing the flexible panel to be repaired based on the second target operating parameter.

8. A device for repairing a flexible panel, comprising:
a processor; and
a memory capable to store computer programs executable by the processor;
wherein the processor implements a repair method for a flexible panel when executing the computer programs, the method comprising:
obtaining first image information of a flexible panel to be repaired;
determining a first classification tag of the flexible panel to be repaired based on a deep learning model and the first image information; and
determining an operating parameter of a repair device according to the first classification tag, and repairing the flexible panel to be repaired based on the operating parameter;
wherein the method comprises:
determining the deep learning model based on a preset number of flexible panel samples to be repaired,
wherein determining the deep learning model based on a preset number of flexible panel samples to be repaired comprises:
dividing the preset number of flexible panel samples to be repaired into training flexible panel samples and verification flexible panel samples according to a preset ratio;
training with the training flexible panel samples to obtain a first model;
inputting the verification flexible panel samples into the first model to obtain a first prediction accuracy rate of the first model; and
determining the deep learning model based on the first prediction accuracy rate;
wherein training with the training flexible panel samples to obtain the first model comprises:
obtaining second image information of each training flexible panel sample;
for each training flexible panel sample, obtaining third image information of a repaired flexible panel sample after the training flexible panel sample is repaired based on the adjusted candidate operating parameter;
determining whether the third image information meets a repair standard for each repaired flexible panel sample;
in response to the third image information of the repaired flexible panel sample not meeting the repair standard, adjusting the candidate operating parameter and repairing the training flexible panel sample based on the adjusted candidate operating parameter, until obtained image information of the repaired flexible panel sample meets the repair standard;
determining a candidate operating parameter corresponding to the obtained image information meeting the repair standard as a second classification tag of the training flexible panel sample;
obtaining the second image information and a second classification tag of each training flexible panel sample, to form a second image information collection and a second classification tag collection;
determining the second image information collection and the second classification tag collection as training sample data; and
obtaining the first model by training with the training sample data.

9. The device of claim 8, wherein training with the training flexible panel samples to obtain the first model comprises:

in response to the third image information of the repaired flexible panel sample not meeting the repair standard, adjusting the candidate operating parameter, repairing the training flexible panel sample based on the adjusted candidate operating parameter, and determining whether the obtained image information of a the repaired flexible panel sample meets the repair standard after the candidate operating parameter is adjusted for m times;

in response to the image information of the repaired flexible panel sample not meeting the repair standard after the candidate operating parameter is adjusted for m times, determining a preset classification tag as the second classification tag of the training flexible panel samples, where m is a preset number.

10. The device of claim 8, wherein different training flexible panels samples have different defect characteristics, the defect characteristics comprise at least one of: a defect classification and defect area.

11. The device of claim 8, wherein determining the deep learning model based on the first prediction accuracy rate comprises:

in response to the first prediction accuracy rate being smaller than a preset accuracy rate, adjusting a model parameter of the first model until the first prediction accuracy rate of the first model is greater than or equal to the preset accuracy rate; and determining the first model with the first prediction accuracy rate greater than or equal to the preset accuracy rate as the deep learning model.

12. The device of claim 8, wherein determining the deep learning model based on the first prediction accuracy rate comprises:

in response to the first prediction accuracy rate being smaller than a preset accuracy rate, determining a second prediction accuracy rate of an alternative second model; and determining a second model with a second prediction accuracy rate greater than or equal to the preset accuracy rate as the deep learning model.

13. The device of claim 8, wherein inputting the verification flexible panel samples into the first model to obtain the first prediction accuracy rate of the first model comprises:

obtaining a third classification tag collection of the verification flexible panel samples;

inputting the verification flexible panel samples into the first model to obtain a prediction result collection of the verification flexible panel samples; and determining the first prediction accuracy rate of the first model based on the prediction result collection and the third classification tag collection.

14. The device of claim 8, wherein repairing the flexible panel to be repaired based on the operating parameter comprises:
- in response to the repair device being multiple, repairing the flexible panel to be repaired by delivering the flexible panel to be repaired to a repair device having a first target operating parameter corresponding to the first classification tag; or
- in response to the repair device being one, adjusting the operating parameter of the repair device to a second target operating parameter corresponding to the first classification tag, and repairing the flexible panel to be repaired based on the second target operating parameter.

15. A non-transitory computer-readable storage medium having stored therein instructions that, when executed by a processor, causes the processor to perform a repair method for a flexible panel, the method comprising:
- obtaining first image information of a flexible panel to be repaired;
- determining a first classification tag of the flexible panel to be repaired based on a deep learning model and the first image information; and
- determining an operating parameter of a repair device according to the first classification tag, and repairing the flexible panel to be repaired based on the operating parameter;
- wherein the method comprises:
- determining the deep learning model based on a preset number of flexible panel samples to be repaired,
- wherein, determining the deep learning model based on a preset number of flexible panel samples to be repaired comprises:
- dividing the preset number of flexible panel samples to be repaired into training flexible panel samples and verification flexible panel samples according to a preset ratio;
- training with the training flexible panel samples to obtain a first model;
- inputting the verification flexible panel samples into the first model to obtain a first prediction accuracy rate of the first model; and
- determining the deep learning model based on the first prediction accuracy rate;
- wherein training with the training flexible panel samples to obtain the first model comprises:
- obtaining second image information of each training flexible panel sample;
- for each training flexible panel sample, obtaining third image information of a repaired flexible panel sample after the training flexible panel sample is repaired based on the adjusted candidate operating parameter;
- determining whether the third image information meets a repair standard for each repaired flexible panel sample;
- in response to the third image information of the repaired flexible panel sample not meeting the repair standard, adjusting the candidate operating parameter and repairing the training flexible panel sample based on the adjusted candidate operating parameter, until obtained image information of the repaired flexible panel sample meets the repair standard;
- determining a candidate operating parameter corresponding to the obtained image information meeting the repair standard as a second classification tag of the training flexible panel sample;
- obtaining the second image information and a second classification tag of each training flexible panel sample, to form a second image information collection and a second classification tag collection;
- determining the second image information collection and the second classification tag collection as training sample data; and
- obtaining the first model by training with the training sample data.

* * * * *